US009494973B2

United States Patent
Hallerström Sjöstedt et al.

(10) Patent No.: US 9,494,973 B2
(45) Date of Patent: Nov. 15, 2016

(54) DISPLAY SYSTEM WITH IMAGE SENSOR BASED DISPLAY ORIENTATION

(75) Inventors: Svante Magnus Ulfstand Hallerström Sjöstedt, Malmö (SE); Marcus Eriksson, Malmö (SE)

(73) Assignee: BlackBerry Limited, Waterloo, Ontario (CA)

( * ) Notice: Subject to any disclaimer, the term of this patent is extended or adjusted under 35 U.S.C. 154(b) by 254 days.

(21) Appl. No.: 13/467,495

(22) Filed: May 9, 2012

(65) Prior Publication Data

US 2013/0300671 A1    Nov. 14, 2013

(51) Int. Cl.
*G06F 3/01* (2006.01)
*G06F 1/16* (2006.01)

(52) U.S. Cl.
CPC ........... *G06F 1/1626* (2013.01); *G06F 1/1649* (2013.01); *G06F 1/1686* (2013.01); *G06F 2200/1614* (2013.01)

(58) Field of Classification Search
CPC ............... G06F 2200/1614; G06F 2200/1637; G06F 3/0325; G06F 1/1686; G06F 3/04886; G06F 1/162; G06F 1/1649
USPC ........................................................ 345/173
See application file for complete search history.

(56) References Cited

U.S. PATENT DOCUMENTS

| | | | |
|---|---|---|---|
| 5,757,369 A * | 5/1998 | Ohsawa et al. ................ 715/750 |
| 6,396,506 B1 * | 5/2002 | Hoshino ............. G06F 3/04855 |
| | | | 345/650 |
| 7,254,775 B2 | 8/2007 | Geaghan et al. |
| 7,453,444 B2 | 11/2008 | Geaghan |
| 7,932,882 B2 | 4/2011 | Shimotone et al. |
| 2005/0210419 A1 | 9/2005 | Kela et al. |
| 2007/0109276 A1* | 5/2007 | Kim ..................... G06F 3/04886 |
| | | | 345/173 |
| 2008/0055105 A1* | 3/2008 | Blum ...................... G06F 3/041 |
| | | | 340/815.4 |
| 2008/0168403 A1* | 7/2008 | Westerman ......... G06F 3/04883 |
| | | | 715/863 |
| 2008/0211778 A1* | 9/2008 | Ording et al. ................ 345/173 |
| 2009/0244016 A1* | 10/2009 | Casparian ............. G06F 1/1616 |
| | | | 345/173 |

(Continued)

FOREIGN PATENT DOCUMENTS

WO        2010030985 A1        3/2010

OTHER PUBLICATIONS

Microsoft Surface Table (Microsoft hereafter, youtube video available from https://www.youtube.com/watch?v=kr1O917o4jl, dated Jan 31, 2011).*

(Continued)

*Primary Examiner* — Priyank Shah
(74) *Attorney, Agent, or Firm* — Fish & Richardson P.C.

(57) ABSTRACT

A display system with image sensor based display orientation is provided. The display system comprises: a display device; a sensor for acquiring at least one electronic image from a field of view proximal the display device; and a processor enabled to: control at least a subset of the display device to a display orientation associated with a given edge of the display device when a portion of the at least one electronic image associated with the given edge comprises a given reference image.

18 Claims, 18 Drawing Sheets

(56) References Cited

U.S. PATENT DOCUMENTS

| | | | |
|---|---|---|---|
| 2009/0322690 A1* | 12/2009 | Hiltunen | G06F 1/1649 |
| | | | 345/173 |
| 2010/0085323 A1 | 4/2010 | Bogue | |
| 2010/0259515 A1* | 10/2010 | Kohara | G06F 1/1624 |
| | | | 345/204 |
| 2011/0012926 A1 | 1/2011 | Kerr et al. | |
| 2011/0065479 A1* | 3/2011 | Nader | 455/566 |
| 2011/0102333 A1* | 5/2011 | Westerman | 345/173 |
| 2012/0084674 A1* | 4/2012 | Visosky | G06F 1/1616 |
| | | | 715/761 |

OTHER PUBLICATIONS

Use Kinect with Xbox Dashboard—http://support.xbox.com/en-GB/kinect/setup-and-playspace/how-to-use-the-kinect-hub-and-guide. Captured Mar. 2, 2012.

Extended European search report mailed Aug. 17, 2012, in corresponding European patent application No. 12167301.6.

\* cited by examiner

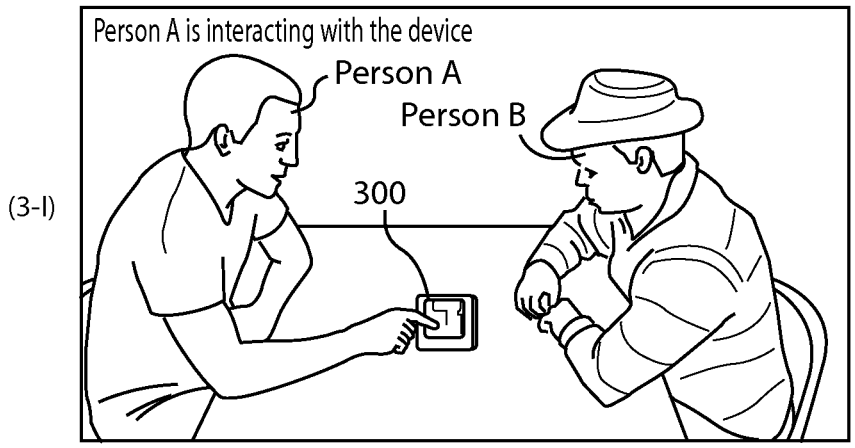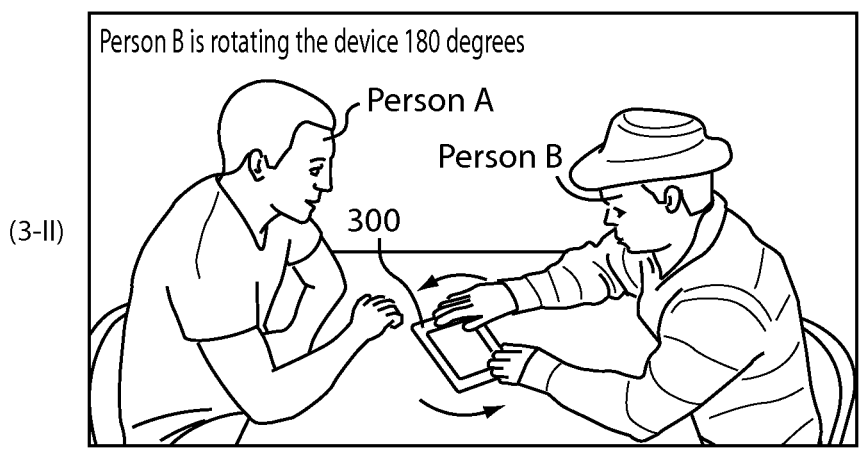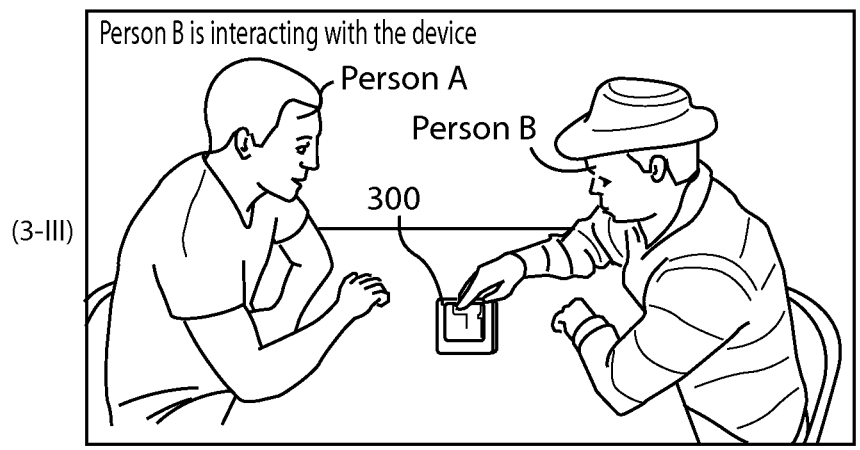
Fig. 3

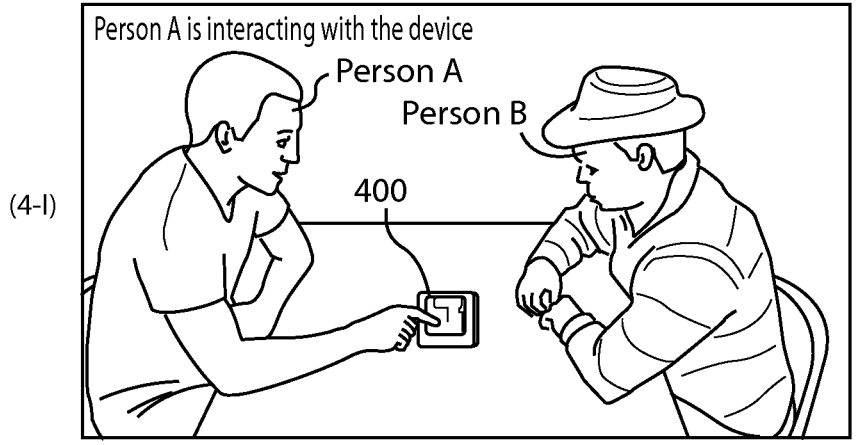
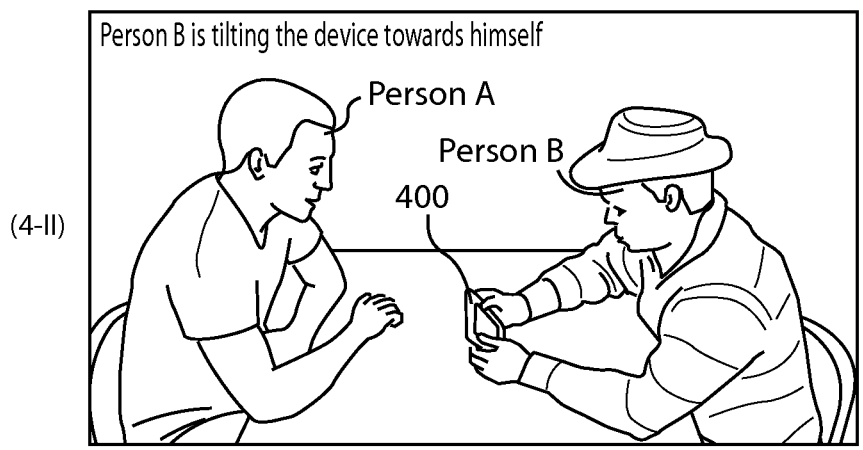
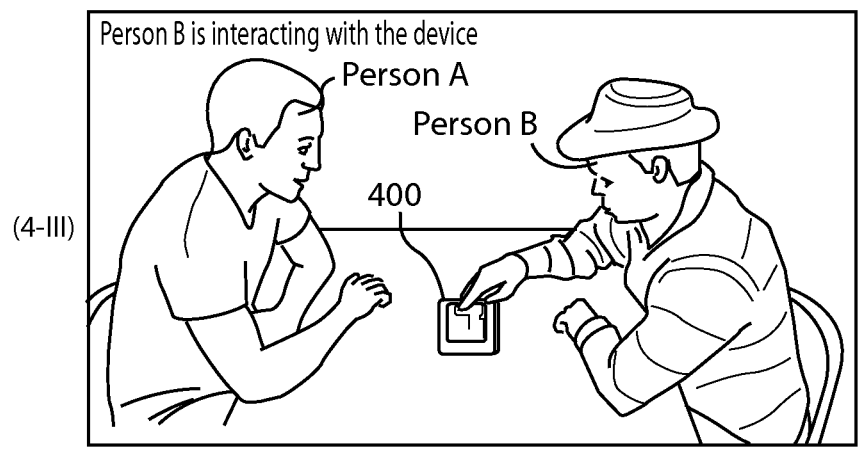
Fig. 4

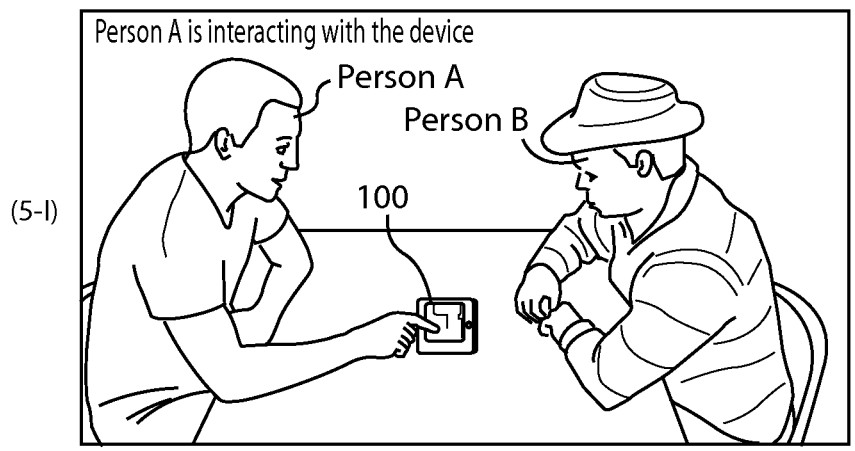
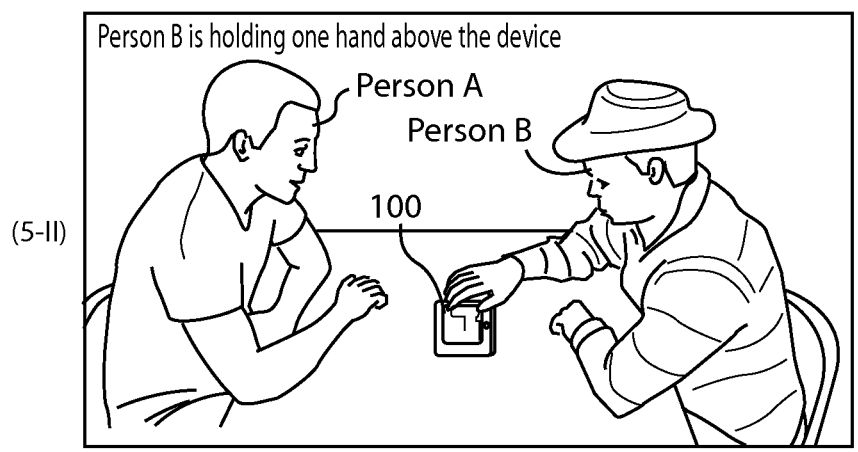
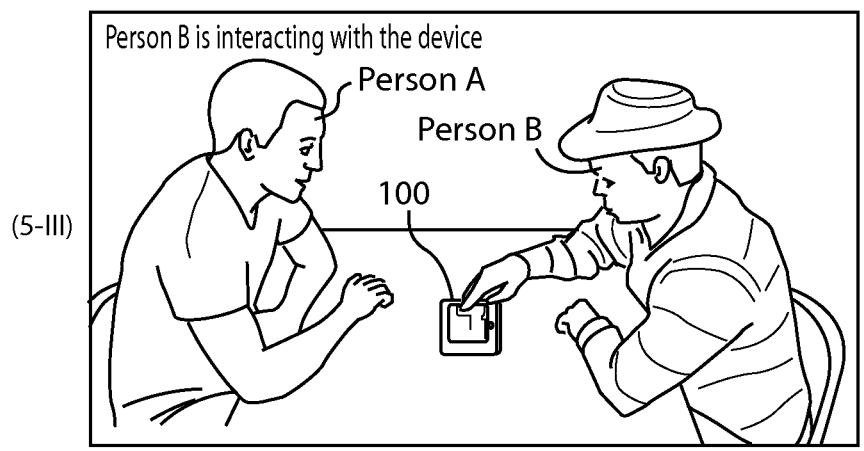
Fig. 5

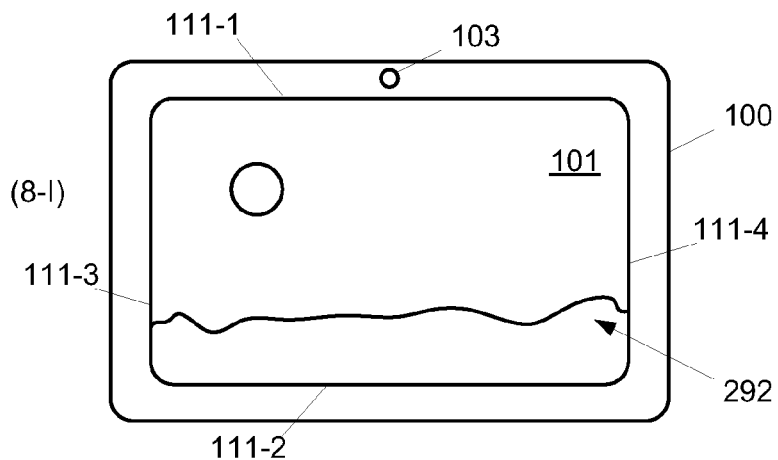
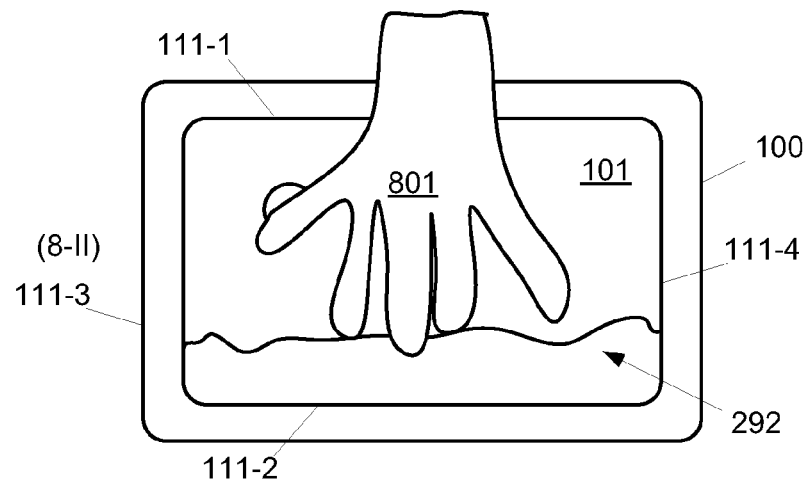
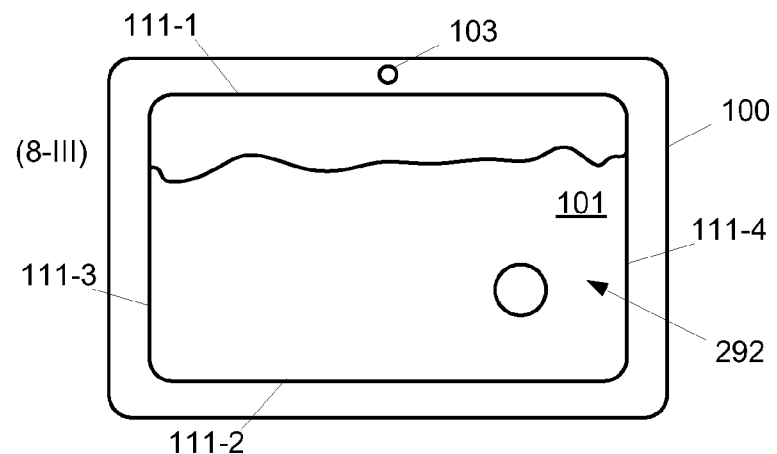
Fig. 8

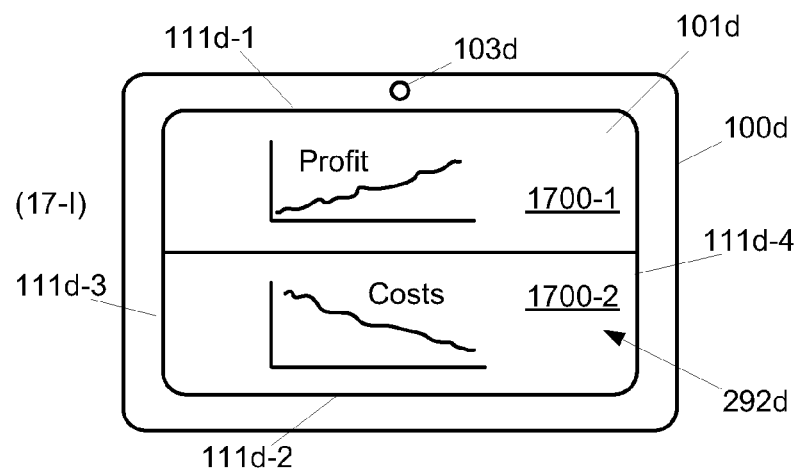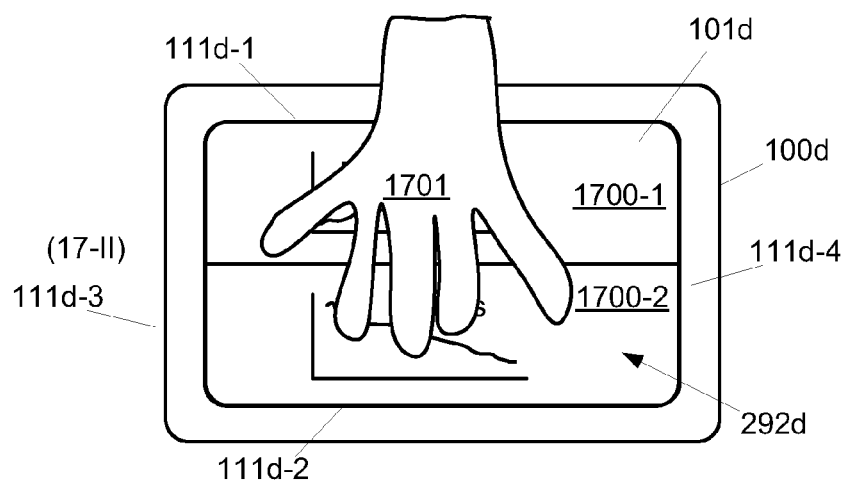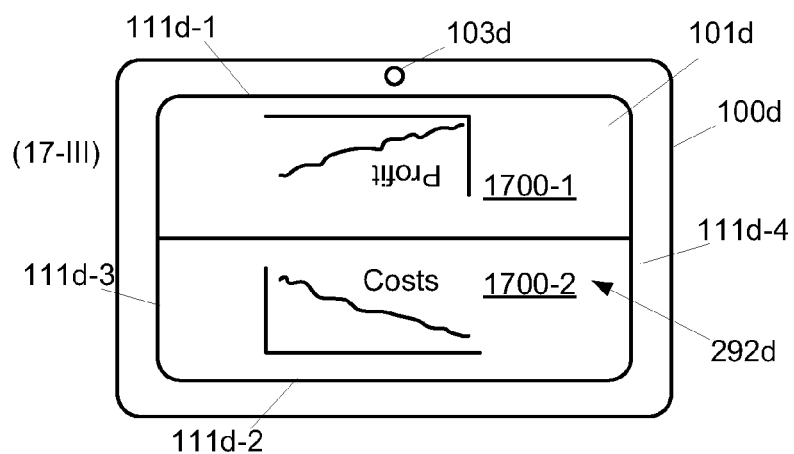
Fig. 17

DISPLAY SYSTEM WITH IMAGE SENSOR BASED DISPLAY ORIENTATION

FIELD

The specification relates generally to a display system, and specifically to a display system with image sensor based display orientation.

BACKGROUND

A display orientation of a display device can be controlled by detecting a physical change in orientation of the display device; however display orientation and physical orientation are not always related. This can lead to changes in display orientation that are incorrect.

BRIEF DESCRIPTIONS OF THE DRAWINGS

For a better understanding of the various implementations described herein and to show more clearly how they may be carried into effect, reference will now be made, by way of example only, to the accompanying drawings in which:

FIG. 3 depicts a scenario for changing display orientation, according to the prior art.

FIG. 4 depicts a scenario for changing display orientation, according to the prior art.

FIG. 5 depicts a scenario for changing display orientation, according to non-limiting implementations.

FIG. 8 depicts details of the scenario of FIG. 5, according to non-limiting implementations.

FIG. 17 depicts a scenario image sensor based display orientation of a subset of a display device, according to non-limiting implementations.

DETAILED DESCRIPTION

Figure 1:
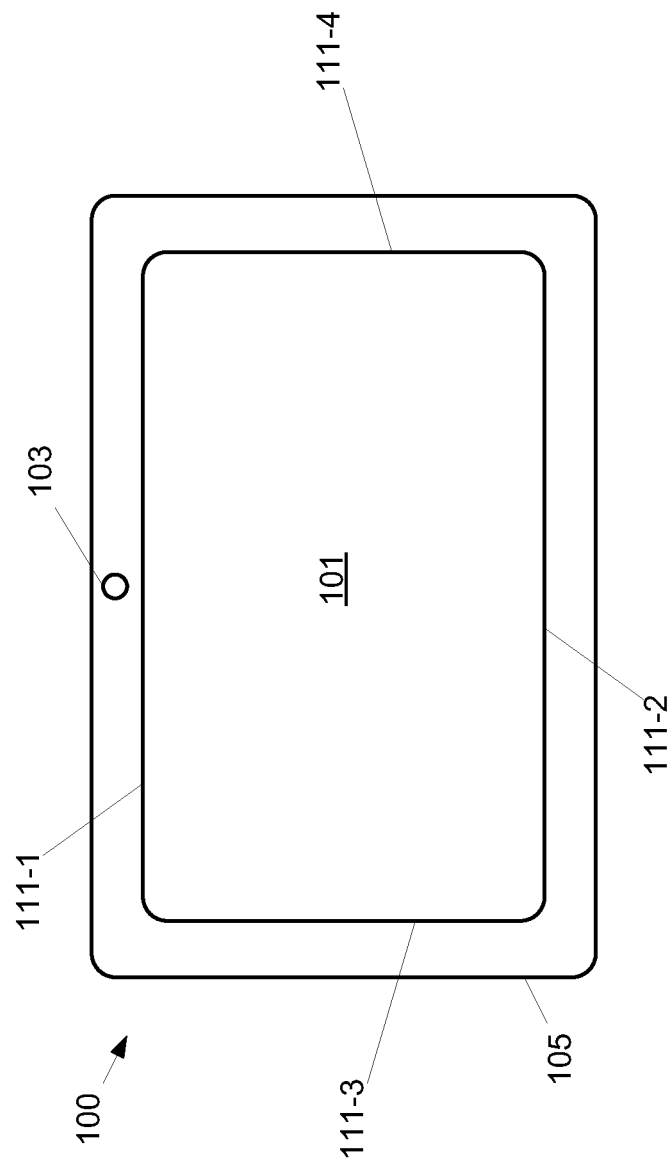
FIG. 1 depicts a front view of a display system with image sensor based display orientation, according to non-limiting implementations.

An aspect of the specification provides a display system comprising: a display device; a sensor for acquiring at least one electronic image from a field of view proximal the display device; and a processor enabled to: control at least a subset of the display device to a display orientation associated with a given edge of the display device when a portion of the at least one electronic image associated with the given edge comprises a given reference image.

The sensor can comprise at least one of: a camera device; a CMOS (Complementary metal-oxide-semiconductor) image sensor; and a CCD (charge-coupled device) image sensor.

The display device can comprise at least one of a cathode ray tube, a flat panel display, a liquid crystal display (LCD), an organic light emitting diode, a plasma display, and a touchscreen.

The display system can further comprises a housing, the housing comprising the display device. The housing further can comprise the sensor located proximal the display device. The housing can be enabled to be laid flat on a surface.

The given reference image can comprise at least one of: a body part, a hand, a face, a foot, and a stylus.

The processor can be further enabled to control at least the subset the display device to the display orientation associated with the given edge by controlling the at least a subset of the display device from a first display orientation associated with an edge opposite the given edge to a second display orientation associated with the given edge.

The first display orientation can be one of a first landscape orientation and a first portrait orientation, and the second display orientation can be one of a second landscape orientation and second portrait orientation.

The display device can be a quadrilateral, and the given edge can comprise a specific edge of the quadrilateral.

The display device can comprise a plurality of edges, wherein each respective edge of the display device is associated respective display orientations of the display device and the processor can be further enabled to: control at least the subset the display device to each of the respective display orientations when the given reference image is determined to be in a respective portion of the at least one electronic image associated with the respective edges.

The processor can be further enabled to: control the at least the subset of the display device to yet a further display orientation associated with two given edges of the display device when a portion of the at least one electronic image associated with the two given edges comprises the given reference image.

The subset can comprise one or more of: an entire image rendered at the display device; a given element rendered at the display device; a selected element rendered at the display device; a selected area of the display device; and a predetermined area of the display device.

The processor can be further enabled to: control the at least the subset of the display device to the display orientation associated with the given edge when the portion of the electronic image associated with the given edge comprises the given reference image for a given time period.

The display system of claim 1, can further comprise an apparatus for determining an incline of the display device, the processor further enabled to: control the at least the subset of the display device to the display orientation associated with the given edge when the portion of the at least one electronic image associated with the given edge of the display device comprises the given reference image and the display device is about level.

The processor can be further enabled to determine that the portion of the at least one electronic image associated with the given edge can comprise the given reference image by one or more of: processing the at least one electronic image; computer vision; comparing at least a subset of the at least one electronic image to the given reference image stored at a memory; and applying mathematical rules associated with the given reference image to the at least one electronic image.

The processor can be further enabled to acquire and store data associated with the given reference image in a learning mode.

The processor can be further enabled to: control at least the subset of the display device to the display orientation associated with the given edge when the portion of the at least one electronic image associated with the given edge comprises a given one of a plurality of given reference images, the plurality of given reference images comprising the given reference image. A number of the plurality of given reference images can be less than or equal to a given maximum number.

The display system can further comprise a tablet device, the tablet device comprising the sensor, the display and the processor.

FIG. 1 depicts a front view of a display system 100 with image based display orientation, according to non-limiting implementations. Display system 100, also interchangeably referred to herein as system 100, comprises a display system 100 and a sensor 103 for acquiring at least one electronic image from a field of view proximal the display system 100. In specific non-limiting implementations, system 100 further comprises a tablet device comprising a housing 105, display system 100 and sensor 103, wherein housing 105 comprises display system 100 and sensor 103. Display system 100 is generally enabled to: control display 101 to a display orientation associated with a given edge of display 101 when a portion of at least one electronic image associated with the given edge comprises a given reference image, the at least one electronic image acquired by sensor 103.

While system 100 is described hereafter with regard to a tablet device, it is appreciated that system 100 can be any display system that includes a display device and a sensor for acquiring electronic images. System 100 can include, but is not limited to, any suitable combination of computing devices, personal computers, laptop computers, portable electronic devices, mobile computing devices, portable computing devices, tablet computing devices, laptop computing devices, desktop phones, telephones, PDAs (personal digital assistants), cellphones, smartphones, camera devices, digital cameras, and the like.

While display 101 is described in further detail below, it is appreciated that display 101 can be a quadrilateral, and in particular square and/or, as depicted, rectangular. Further display 101 comprises edges 111-1, 111-2, 111-3, 111-4 (generically an edge 111 and collectively edges 111). Further edge 111-1 is closest to sensor 103, edge 111-2 is opposite edge 111-1, and edges 111-3, 111-4 extend between edges 111-1, 1111-2. In the depicted physical orientation of display system 100, edges 111-1, 111-2, 111-3, 111-4 can also be referred to top edge 111-1, bottom edge 111-2, left edge 111-3, and right edge 111-4. Hence, respective top, bottom, left and right portions and/or edges of an electronic image acquired by sensor 103 can be respectively associated with top edge 111-1, bottom edge 111-2, left edge 111-3, and right edge 111-4. Further, as will presently be described, the given edge comprises a specific edge of the quadrilateral.

Further, when display 101 is quadrilateral, display system 100 is generally enabled to: control display 101 to a display orientation associated with a specific edge of the quadrilateral when a portion of at least one electronic image associated with the given edge comprises a given reference image, the at least one electronic image acquired by sensor 103.

Sensor 103 generally comprises a device for acquiring digital images, including but not limited one or more of a camera device, a video device, a CMOS (Complementary metal-oxide-semiconductor) image sensor and a CCD (charge-coupled device) image sensor. However, any suitable device for acquiring digital images is within the scope of present implementations. While system 100 can comprise further sensors, it is appreciated that in particular sensor 103 is enabled to acquire electronic images from a field of view proximal display 101, for example in front of display 101. Hence, sensor 103 is generally located proximal display 101. Further, the electronic images acquired by sensor 103 can comprise one or more of camera images, video images, video streams and the like.

It is yet further appreciated that in some implementations sensor 103 can comprise an infrared sensor such that electronic images comprise electronic infrared images and hence display system 100 can function in low ambient lighting scenarios.

Housing 105 can be any suitable housing for containing display system 100 and sensor 103, and can comprise any suitable combination of metal, plastic and glass. It is further appreciated that housing 105 can comprise suitable optical apertures for each of display 101 and sensor 103. For example, display 101 can be contained in housing 105 but visible, for example, to a user of system 100; similarly sensor 103 can be contained in housing 105 can acquire electronic images in a field of view proximal display 101. In depicted implementations, it is appreciated that housing 105 is enabled to be laid flat on a surface.

Figure 2:
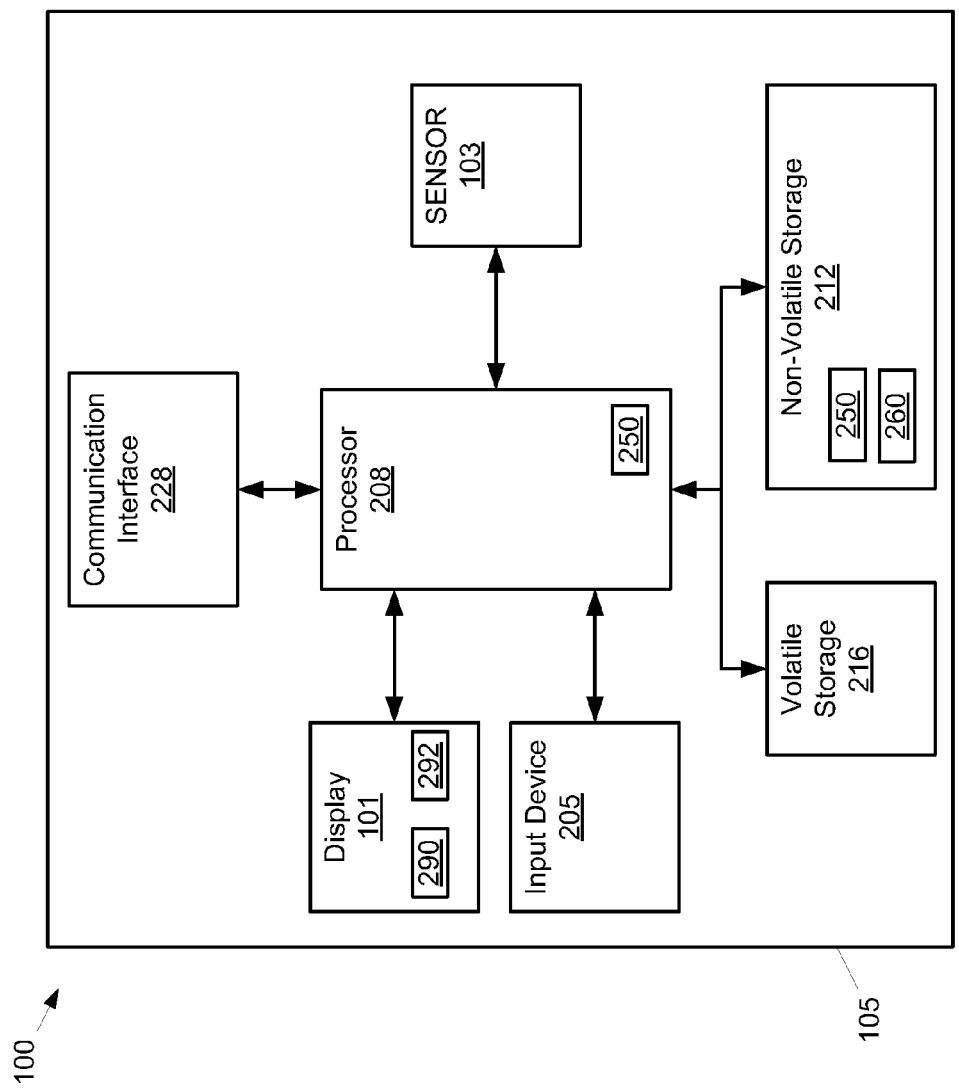
FIG. 2 depicts a schematic diagram of the display system of FIG. 1, according to non-limiting implementations.

Attention is directed to FIG. 2, which depicts a schematic diagram of system 100 according to non-limiting implementations. It should be emphasized that the structure in FIG. 2 is purely exemplary, and contemplates a device that can be used to both acquire and render data at display 101. In some implementations, system 100 can be used for wireless data communications (e.g. email, web browsing, text, and the like) and/or wireless voice (e.g. telephony).

System 100 comprises at least one input device 205 generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations. When system 100 comprises a tablet device, it is appreciated that input device comprises a touchscreen device.

Input from input device 205 is received at processor 208 (which can be implemented as a plurality of processors, including but not limited to one or more central processors (CPUs)). Processor 208 is configured to communicate with a non-volatile storage unit 212 (e.g. Erasable Electronic Programmable Read Only Memory ("EEPROM"), Flash Memory) and a volatile storage unit 216 (e.g. random access memory ("RAM")). Programming instructions that implement the functional teachings of sensor 103 as described herein are typically maintained, persistently, in non-volatile storage unit 212 and used by processor 208 which makes appropriate utilization of volatile storage unit 216 during the execution of such programming instructions. Those skilled in the art will now recognize that non-volatile storage unit 212 and volatile storage unit 216 are examples of computer readable media that can store programming instructions executable on processor 208. Furthermore, non-volatile storage unit 212 and volatile storage unit 216 are also examples of memory units and/or memory modules.

It is further appreciated that electronic images acquired at sensor 103 can be stored at non-volatile storage unit 212, and hence non-volatile storage unit 212 comprises a memory for storing electronic images acquired by sensor 103. Alternatively, electronic images acquired by sensor 103 can be stored at one or memories external to sensor 103, which can be one or more of local and remote to sensor 103. When an external memory is used to store electronic images acquired by sensor 103, sensor 103 can further comprise an interface (not depicted) for accessing the external memory.

In some implementations, processor 208 comprises an image processor and/or an image processing engine. In other implementations, sensor 103 further comprises one or more of an image processor and/or an image processing engine implemented at one or more second processors in communication with processor 208. Hence, processor 208 and/or the second processor and/or the image processor and/or the image processing engine can be further enabled to communicate with sensor 103 to receive images and/or a signal there from for processing and/or analysis. In yet further implementations, processor 208 and/or the second processor and/or the image processor and/or the image processing engine can be enabled with computer vision capability.

Processor 208 can be further configured to communicate with display 101. Display 101 comprises any suitable one of or combination of CRT (cathode ray tube) and/or flat panel displays (e.g. LCD (liquid crystal display), plasma, OLED (organic light emitting diode), capacitive or resistive touchscreens, and the like). It is generally appreciated that display 101 comprises circuitry 290 that can be controlled, for example by processor 208, to render an image 292 of data at display 101.

In particular, processor 208 can be enabled to control a display orientation of display 101 based on at least one electronic image acquired at sensor 103, as will be explained below. In particular, it is appreciated that, non-volatile storage unit 212 can store an application 250 such that when processor 208 processes application 250, processor 208 is enabled to: control at least a subset of display 101 to a display orientation associated with a given edge of display 101 when a portion of at least one electronic image associated with the given edge comprises a given reference image, the at least one electronic image acquired by sensor 103.

It is further appreciated that non-volatile memory unit 212 stores data 260 indicative of the given reference image. As will become apparent in the following description, the given reference image can comprise any suitable image including, but not limited to, a body part, a hand, a face, a foot, and a stylus. Further, processor 208 can be enabled to process at least one electronic image received from sensor 103 to determine whether the at least one electronic image comprises the given reference image, as well a location of the given reference image in the at least one electronic image. Processor 208 can make these determinations through one or more of: processing the at least one electronic image; computer vision; comparing at least a subset of the at least one electronic image to data 260 indicative of the given reference image stored at non-volatile storage unit 212; and applying mathematical rules associated with the given reference image to the at least one electronic image.

It is appreciated that in some implementations data 260 can comprise the given reference image. However, in other implementations, data 260 need not comprise a specific representation of the given reference image. For example, when the given reference image comprises a hand, data 260 can comprise mathematical data and/or mathematical rules which, when processed by processor 208 can cause processor 208 to detect a hand in electronic images received from sensor 103. For example, pixels in electronic images from sensor 103 can be processed to determine patterns that are indicative of a hand.

It is further appreciated that processor 208 can be enabled, upon processing application 250, to determine where the given reference image is located in electronic images received from sensor 103. For example, processor 208 can determine when a hand is located in a portion of an electronic image associated with an edge of display 101.

In depicted implementations, processor 208 also connects to a network communication interface 228, referred to hereafter as interface 228, which can be implemented as one or more radios configured to communicate with one or more communication networks. In general, it will be appreciated that interface 228 is configured to correspond with the network architecture that is used to implement one or more communication links to the one or more communication networks, including but not limited to any suitable combination of USB (universal serial bus) cables, serial cables, wireless links, cell-phone links, cellular network links (including but not limited to 2G, 2.5G, 3G, 4G+, and the like) wireless data, Bluetooth links, NFC (near field communication) links, WiFi links, WiMax links, packet based links, the Internet, analog networks, the PSTN (public switched telephone network), access points, and the like, and/or a combination.

Figure 16:
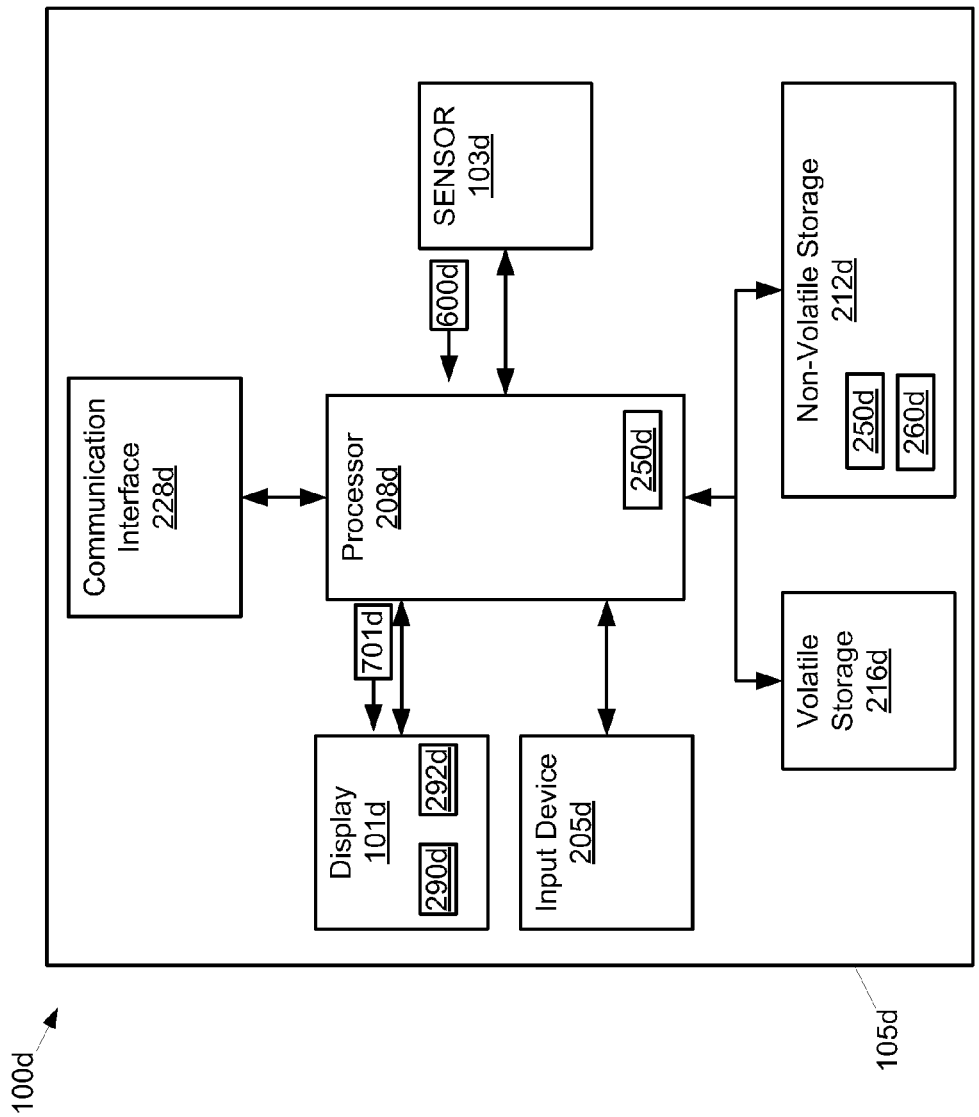
FIG. 16 depicts a schematic diagram of a display system with image sensor based display orientation of a subset of a display device, according to non-limiting implementations.

It is appreciated that in depicted implementation, housing 105 contains display 101, sensor 103, processor 208, non-volatile storage unit 212 and volatile storage unit 216. As will be explained in more detail below with reference to FIG. 16, in some implementations, one or more of sensor 103, input device 205, non-volatile storage unit 212, and volatile storage unit 216 are external to housing 105. When sensor 103 is external to housing 105, it is nonetheless appreciated that sensor 103 is proximal display 101.

It is further appreciated that system 100 can comprise any other suitable applications for operating and/or configuring system 100, including, but not limited to, camera applications, imaging applications, presentation applications, messaging applications, gaming applications and the like.

While not depicted, it is further appreciated that sensor 103 further comprises one or more of a power source, including but not limited to a battery and/or a connection to an external power source, including, but not limited to, a main power supply.

In any event, it should be understood that in general a wide variety of configurations for system 100 are contemplated.

Several scenarios in the prior art are now described. As such, attention is next directed to FIG. 3, which depicts a first scenario according to the prior art. It is appreciated that there are three drawings in FIG. 3, labelled (3-I), (3-II), (3-III), showing a flow of events in the first scenario. Specifically, two people, Person A and Person B are interacting with each other and a tablet device 300 which has been placed on a surface between them. At (3-I), Person A is interacting with tablet device 300, and a display of tablet device 300 is electronically oriented in a landscape mode, with a bottom of a rendered image at an edge of the display closest to Person A. However, Person B now wishes to interact with tablet device 300; as the display is electronically oriented towards Person A, and away from Person B, Person B rotates tablet device 300 by 180° (3-II) such that the bottom edge of the rendered image is now closest to Person B such that Person B can interact with tablet device (3-III). The display is now electronically oriented towards Person B by way of changing the physical orientation of tablet device 300. If tablet device 300 comprises a sensor for detecting movement and/or a change in a physical orientation of tablet device 300, such as an accelerometer and the like, the act of rotating tablet device 300 can cause the display orientation of the display to change such that that the bottom edge of the rendered image is now closest to Person A. In other words, movement of tablet device 300 can cause the display orientation of the display to be incorrect.

Attention is next directed to FIG. 4, which depicts a second scenario according to the prior art. It is appreciated that there are three drawings in FIG. 4, labelled (4-I), (4-II), (4-III), showing a flow of events in the second scenario. Specifically, two people, Person A and Person B are interacting with each other and a tablet device 400 which has been placed on a surface between them, similar to FIG. 3. At (4-I), Person A is interacting with tablet device 400, and a display of tablet device 400 is electronically oriented in a landscape mode, with a bottom of a rendered image at an edge of the display closest to Person A. However, Person B now wishes to interact with tablet device 400; as the display is electronically oriented away from Person B, Person B picks up tablet device 400 and tilts tablet device 400 towards himself (4-II). It is appreciated that tablet device 400 comprises a sensor for detecting movement and/or a change in a physical orientation of tablet device 300, such as an accelerometer and the like, and which causes a change in the display orientation of the display in response a detected change in movement and/or physical orientation. Hence, when tablet device 400 is tilted, the display orientation of the display changes such that the bottom edge of the rendered image is now closest to Person B such that Person B can interact with tablet device (4-III). However, when Person B lays tablet device 400 flat again (4-III), as tablet device 400 is again in motion, the display orientation can again change to an incorrect orientation.

Attention is next directed to FIG. 5 which depicts a scenario according to present non-limiting implementations. It is appreciated that there are three drawings in FIG. 5, labelled (5-I), (5-II), (5-III), showing a flow of events in the scenario. Specifically, two people, Person A and Person B are interacting with each other and a display system 100, in the form of a tablet device, which has been placed on a surface between them. At (5-I), Person A is interacting with display system 100, and a display of display system 100 is electronically oriented in a landscape mode, with a bottom of rendered image 292 at an edge of the display closest to Person A. However, Person B now wishes to interact with display system 100; as the display is electronically oriented towards Person A, and away from Person B, Person B holds his hand above display system 100 such that a portion of an electronic image acquired by sensor 103 comprises an image of his hand.

Figure 6:
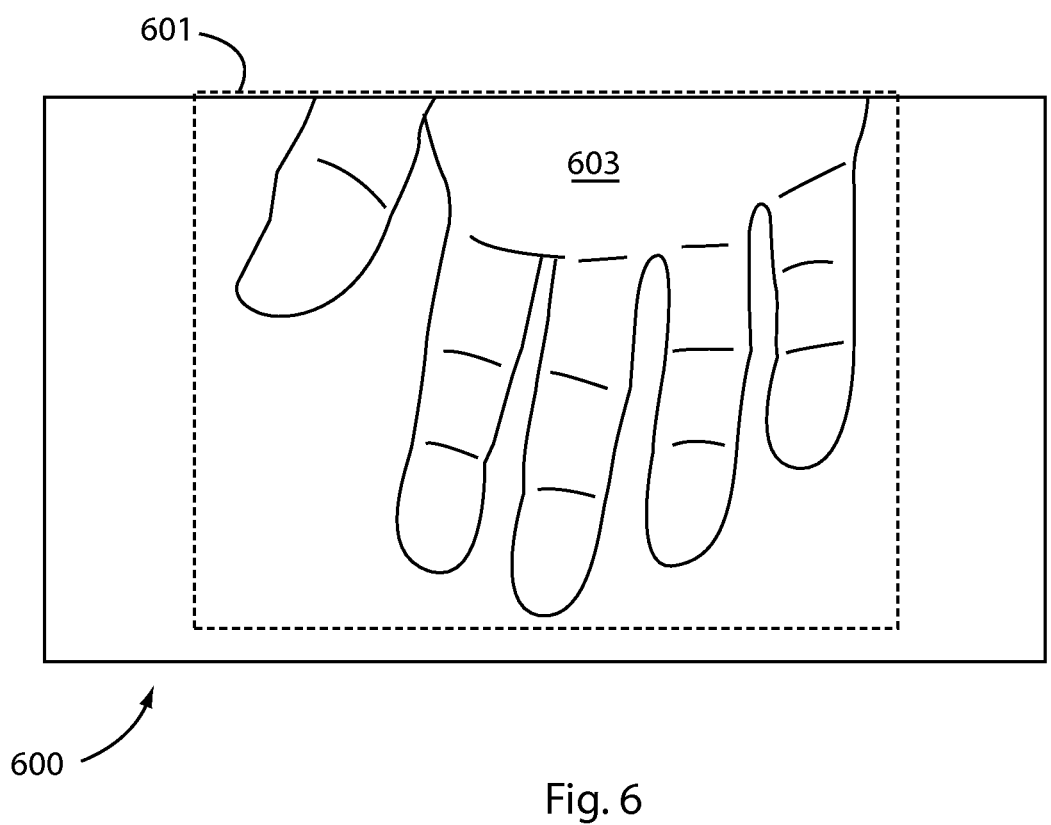
FIG. 6 depicts an electronic image acquired by a sensor of the display system of FIG. 1, according to non-limiting implementations.

For example, attention is directed to FIG. 6 which depicts an electronic image 600 acquired by sensor 103, according to non-limiting implementations. Electronic image 600 comprises a portion 601 associated with a given edge of display 101; for example, with reference to FIG. 1, as portion 601 comprises at least a subset of a top portion of electronic image 600, portion 601 is associated with top edge 111-1 of display 101. In any event, it is appreciated that portion 601 further comprises an image 603 of a hand, i.e. the hand of Person B. Hence, in implementations where the given reference image is a hand (i.e. data 260 is indicative of a hand), processor 208 determines that portion 601 associated with a given edge (i.e. top edge 111-1) of display 101 comprises the given reference image.

It is further appreciated that portion 601 can be dynamic and determined once image 603 is identified. In other words, image 603 can be identified and then it can be determined whether image 603 is in a portion of image 600 associated with edge 111-1 of display 101. Further, while portion 601 is depicted a rectangle the boundaries of portion 601 are not to be so limited; indeed, in some implementations, the boundaries of portion 601 need not be determined; rather processor 208 determines that image 603 is in a portion of image 600 associated with edge 111-1 of display 101 without specifically determining boundaries therefor.

In response, processor 208 controls the display 101 to a display orientation associated with edge 111-1 of display 101. Hence, returning to FIG. 5, the bottom edge of rendered image 292 at display 101 is now closest to Person B such that Person B can interact with tablet device (5-III). The change in orientation is accomplished without display system 100 being moved, in contrast to FIGS. 3 and 4.

Figure 7:
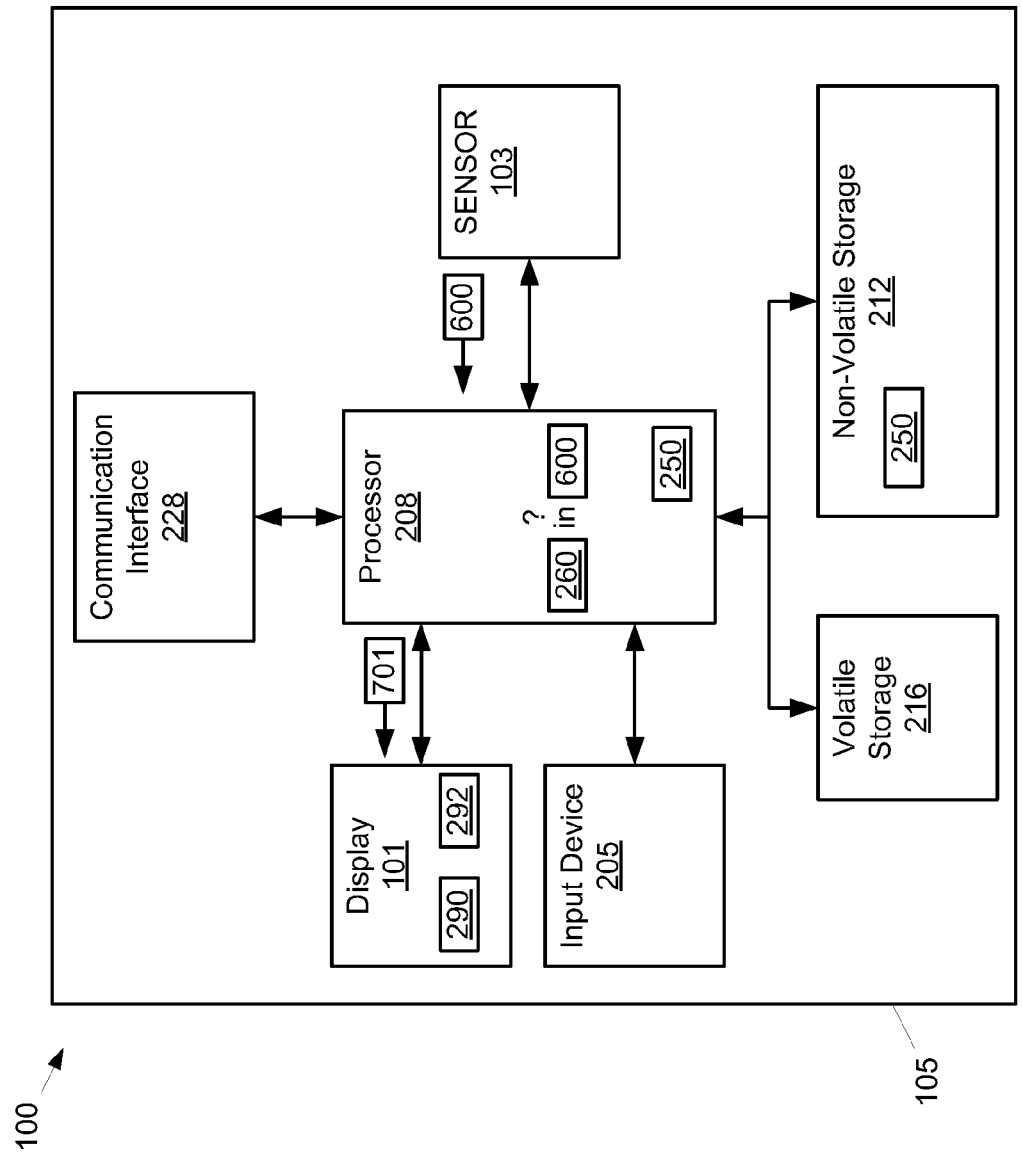
FIG. 7 depicts a schematic diagram of the display system of FIG. 1 with an electronic image being acquired at the sensor and a processor controlling a display orientation in response, according to non-limiting implementations.

It is appreciated that electronic image 600 is not the image rendered at display 101; rather as depicted in FIG. 7, which is substantially similar to FIG. 2, with like elements having like numbers, electronic image 600 is received at processor 208 and compared to data 260; when processor 208 determines that portion 601 comprises the given reference image, as indicated by data 260, processor controls display 101 to a display orientation associated with a given edge (i.e. top edge 111-1) of display 101 via a signal 701 to display 101 causing circuitry 290 to change a display orientation of rendered image 292.

For example, FIG. 8 depicts a sequence according to present implementations. Indeed, it is appreciated that FIG. 8 depicts details of the sequence of FIG. 5 with respect to display system 100. It is appreciated that there are three drawings in FIG. 8, labelled (8-I), (8-II), (8-III), respectively corresponding to (5-I), (5-II), (5-III) of FIG. 5, but depicting display system 100 in further detail. It is further appreciated that rendered image 292 is depicted in FIG. 8 at display 101.

In any event, (8-I) depicts display system 100 as in (5-I) in a first display orientation, with a bottom of rendered image 292 along bottom edge 111-2. However, Person B then holds his hand 801 over display system 100, hand 801 approaching display system 100 along top edge 111-1, such that sensor 103 acquires electronic image 600 of hand 801 as depicted in FIG. 6. As has already been described, processor 208 determines that portion 601 of electronic image 600 comprises a given reference image, i.e. a hand. In response (8-III), processor 208 controls display 101 to a display orientation associated with edge 111-1. In other words, the display orientation of display 101 changes to a second display orientation, with a bottom of rendered image 292 along top edge 111-1 (i.e. the display orientation changes by 180°). Hence, processor 208 controls display 101 to the display orientation associated with edge 111-1 by controlling display 101 from a first display orientation associated with edge 111-2 opposite edge 111-1 to a second display orientation associated with edge 111-1.

Figure 9:
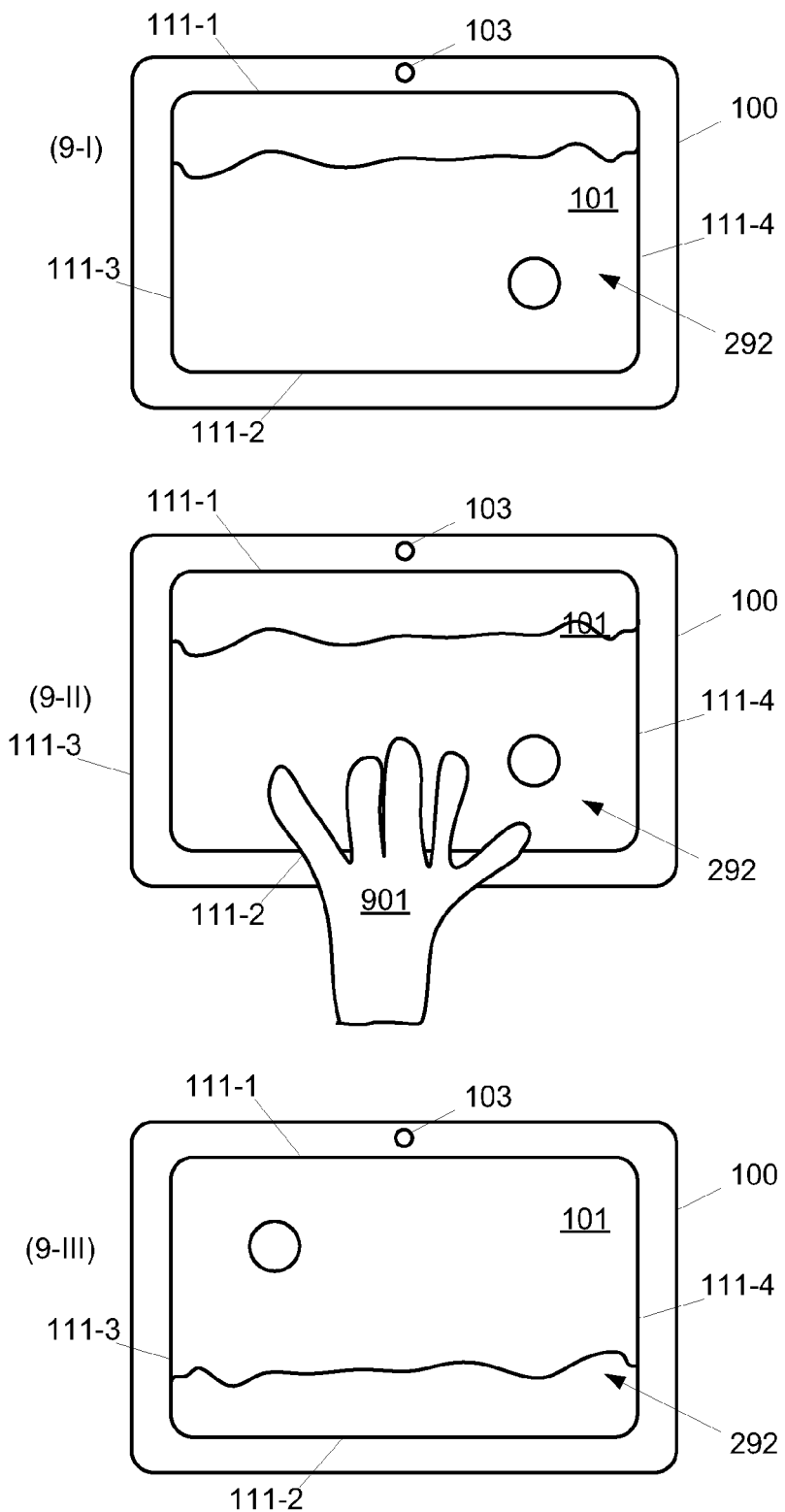
FIG. 9 depicts another scenario for changing display orientation, according to non-limiting implementations.

FIG. 9 depicts another sequence according to present implementations. It is appreciated that there are three drawings in FIG. 9, labelled (9-I), (9-II), (9-III). Indeed, it is appreciated that FIG. 9 is similar to FIG. 8, however (8-III) of FIG. 8 is the same as (9-I), which is used as the starting point in FIG. 9: as in (8-I), in (9-I) a bottom of rendered image 292 is along top edge 111-1 of display system 100.

Figure 10:
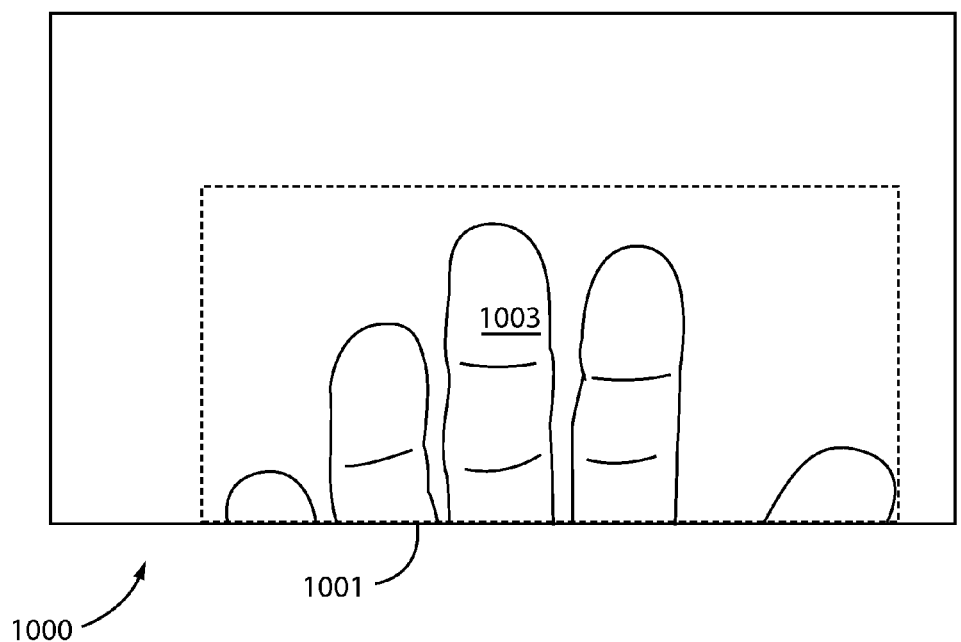
FIG. 10 depicts an electronic image acquired by a sensor of the display system of FIG. 1, according to non-limiting implementations.

However, Person A then holds his hand 901 over display system 100 (i.e. (9-II)), hand 901 approaching display system 100 along bottom edge 111-2, such that sensor 103 acquires electronic image 1000 of hand 901 as depicted in FIG. 10. Indeed, FIG. 10 is similar to FIG. 6, described, above, however FIG. 10 depicts an electronic image 1000 of hand 901, electronic image 1000 comprising a portion 1001 associated with a given edge of display 101; for example, with reference to FIG. 9, as portion 1001 comprises at least a subset of a bottom portion of electronic image 1000, portion 1001 is associated with top edge 111-1 of display 101. In any event, it is appreciated that portion 1001 further comprises an image 1003 of hand 901, i.e. the hand of Person A.

Hence, processor 208 determines that portion 1001 of electronic image 1000 comprises a given reference image, i.e. a hand. In response (9-III), processor 208 controls display 101 to a display orientation associated with edge 111-2. In other words, the display orientation of display 101 changes to a second display orientation, with a bottom of rendered image 292 along bottom edge 111-2 (i.e. the display orientation changes by) 180°.

However, FIG. 10 further illustrates only a portion of a given item associated with a given reference image can be in a field of view of sensor 103 to determine that the electronic image comprises the given reference image. In other words, in FIG. 10 the given reference image comprises a hand, but portion 1001 of electronic image 1000 comprise only fingers of a hand. However, the fingers are enough for processor 208 to determine that a hand appears in electronic image 1000.

While in implementations described hereto for, only landscape orientations have been described with respect to display orientation, display 101 can be controlled to any suitable display orientation, including but not limited to landscape orientations and portrait orientations. Further while only changes in display orientation of 180° have been described hereto for, it is appreciated that any suitable change in display orientation is within the scope of present implementations, including, but not limited to, 45°, 90°, 135°, 180°, 225°, and 270°.

In other words, display 101 comprises a plurality of edges 111, and each respective edge 111 can be associated with respective display orientations of display 101. Hence, processor 208 can be further enabled to: control display 101 to each of the respective display orientations when the given reference image is determined to be in a respective portion of the at least one electronic image associated with the respective edges. Hence, when a given reference image is determined to be in a portion of an electronic image associated with left edge 111-3, the display orientation of display 101 is controlled to a portrait orientation with the bottom of rendered image 292 aligned with left edge 111-3. Similarly, when a given reference image is determined to be in a portion of an electronic image associated with right edge 111-4, the display orientation of display 101 is controlled to a portrait orientation with the bottom of rendered image 292 aligned with right edge 111-4. Hence, while in implementations described hereto for, display system 100 is placed between Person A and Person B in a landscape orientation, with processor 208 controlling the display orientation between a first landscape orientation and second landscape orientation, in other implementations, display system 100 can be placed between Person A and Person B in a portrait orientation and processor 208 can control the display orientation between a first portrait orientation and second portrait orientation.

In yet further implementations, display system 100 can be placed between four users one at each edge 111 of display system 100, and processor 208 can control the display system 100 between the four display orientations associated with each edge 111.

In yet further implementations, a user can be at a corner of display system 100, such that when the user places his hand over display system 100, and an electronic image of the hand is acquired by sensor 103, processor 208 can control display 101 to a display orientation associated with two given edges 111 of display 101 when a portion of the at least one electronic image associated with the two given edge 111 comprises the given reference image. In other words, rendered image 292 is rotated by 45°, or similar, from a portrait or landscape orientation.

Figure 11:
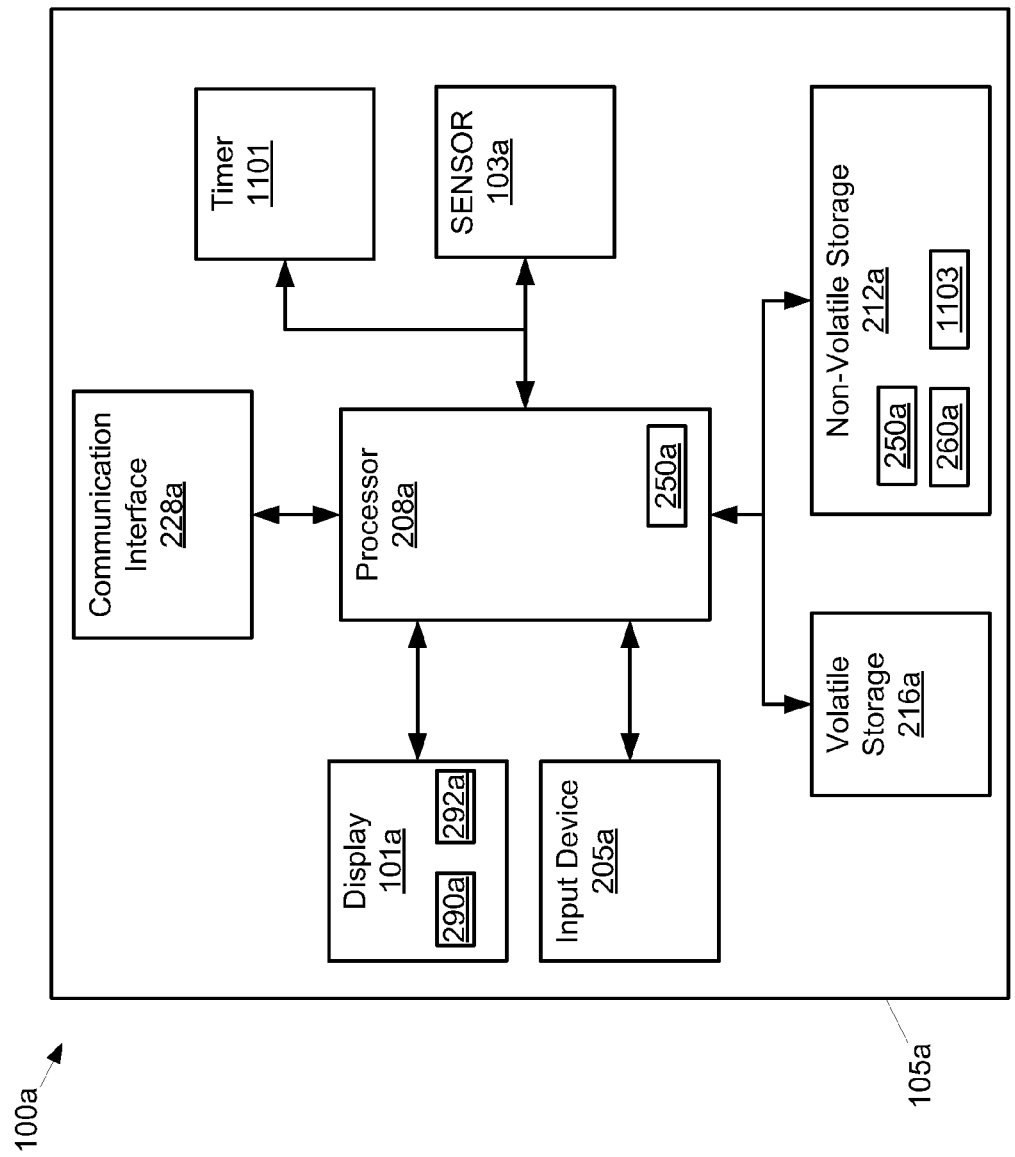
FIG. 11 depicts a schematic diagram of a display system with image sensor based display orientation and a timer, according to non-limiting implementations.

Attention is next directed to FIG. 11, which depicts a display system 100a similar to display system 100. It is appreciated that FIG. 11 is substantially similar to FIG. 2, with like elements having like numbers, however with an "a" appended thereto. Hence display system 100a comprises a display 101a (comprising circuitry 290a that can be controlled to render an image 292a of data at display 101a), a sensor 103a, a housing 105a, an input device 205a, a processor 208a, non-volatile storage unit 212a, volatile storage unit 216a, and an optional communication interface 228a. However, in these implementations, display system 100a further comprises a timer 1101. In some implementations, processor 208a can comprise timer 1101.

Further, in addition to storing application 250a and data 260a, non-volatile storage unit 212a further stores given time period data 1103, such that processor 208a is enabled to: control display 101a to a display orientation associated with a given edge of display 101a when a portion of electronic images associated with the given edge, and acquired by sensor 103a, comprises the given reference image for a given time period.

In other words, to prevent accidental changes in display orientation, in these implementations, the display orientation is changed when the given reference image appears in the electronic images acquired by sensor 103 for a given time period. The given time period can be any suitable time period, including, but not limited to, time periods in the range of about 0.5 seconds to about 10 seconds. For example, processor 208a can use timer 1101 to determine how long the reference image appears in the at least one electronic image. When the reference image appears for a given time period, as stored in given time period data 1103, processor 208a controls the display orientation of display 101a as described above. In some implementations, given time period data 1103 can be stored at timer 1101 and/or software coded into application 250a.

Figure 12:
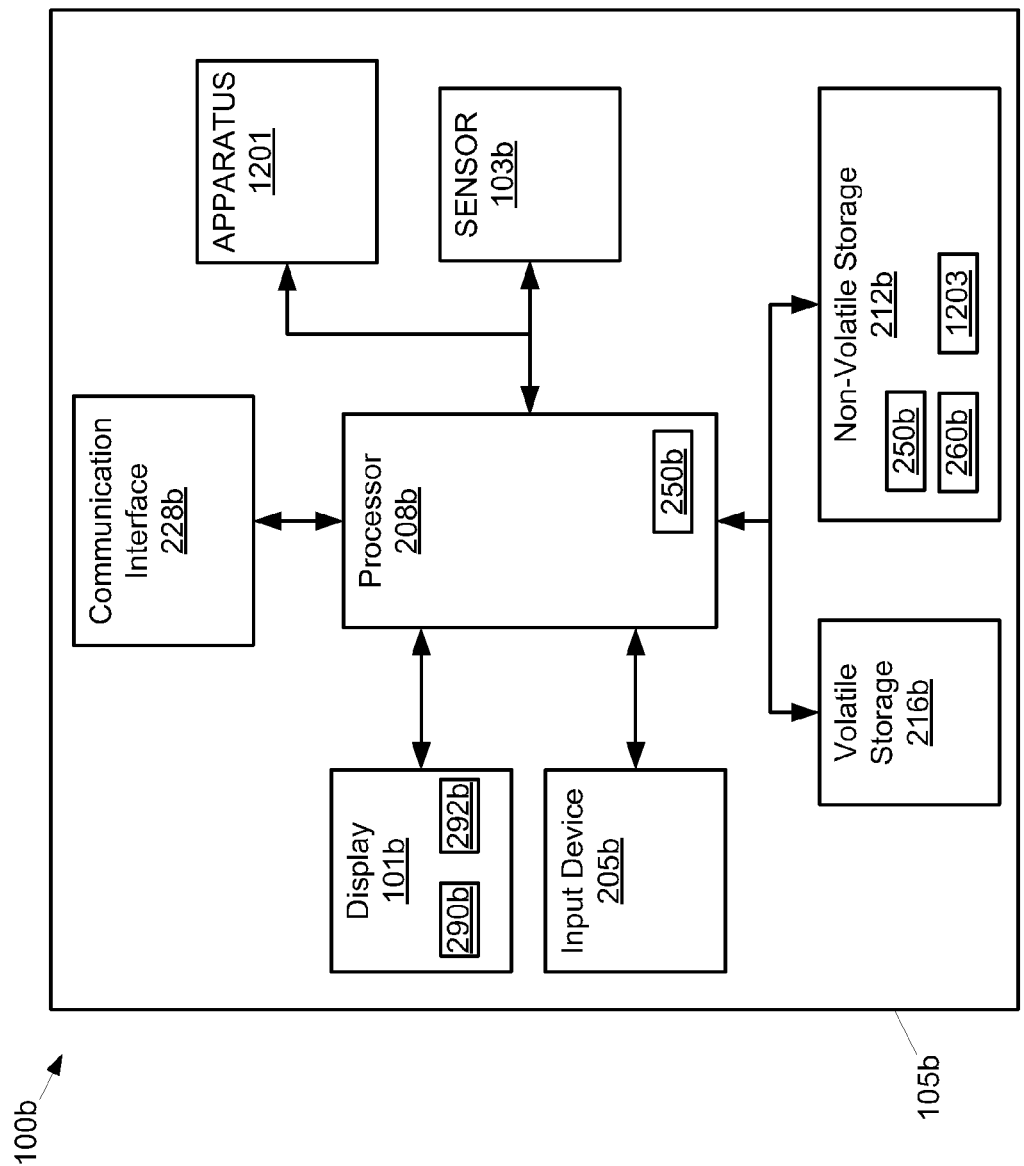
FIG. 12 depicts a schematic diagram of a display system with image sensor based display orientation and an apparatus for determining whether a display device is level, according to non-limiting implementations.

Attention is next directed to FIG. 12, which depicts a display system 100b similar to display system 100. It is appreciated that FIG. 12 is substantially similar to FIG. 2, with like elements having like numbers, however with a "b" appended thereto. Hence display system 100b comprises a display 101b (comprising circuitry 290b that can be controlled to render an image 292b of data at display 101b), a sensor 103*b*, a housing 105*b*, an input device 205*b*, a processor 208*b*, non-volatile storage unit 212*b*, volatile storage unit 216*b*, and an optional communication interface 228*b*. However, in these implementations, display system 100*b* further comprises an apparatus 1201 for determining an incline of display 101*b*, for example as defined by a measured angle of tilt of display 101*b*. Apparatus 1201 can comprise one or more of: an inclinometer, an accelerometer, a tilt meter, a tilt indicator, a slope alert, a slope gauge, a gradient meter, a gradiometer, a level gauge, a level meter, a declinometer, a pitch & roll indicator, and the like. It is further appreciated that a tilt angle measured by apparatus 1201 is generally measured with respect to the ground.

Further, in addition to storing application 250*b* and data 260*b*, non-volatile storage unit 212*b* further stores level data 1203, comprising at least one of: a range of angles, within which display 101*b* is considered to be level, angle at which display 101*b* is considered to be level, and the like. The angle of tilt of display 101*b* (and/or display system 101*b*) is to be about level can be any range, including, but not limited to about 0° to about 45°.

In any event, in these implementations, processor 208*b* is enabled to: control display 101*b* to a display orientation associated with a given edge of display 101 when a portion of at least one electronic image associated with the given edge of display 101*b* comprises the given reference image and display 101*b* is about level.

In other words, to prevent accidental changes in display orientation, in these implementations, the display orientation is changed when the given reference image appears in the electronic images acquired by sensor 103 when display 101*b* (and/or display system 101*b*) is about level as measured by apparatus 1201 and defined by level data 1203.

For example, processor 208*a* can use apparatus 1201 to determine an angle of tilt of display 101*b* (and/or display system 101*b*). When the reference image appears in an electronic image acquired from sensor 103*b*, and display 101*b* (and/or display system 101*b*) is about level (i.e. the measured angle of tilt is within a range stored in level data 1203), processor 208*b* controls the display orientation of display 101*b* as described above. When the reference image appears in an electronic image acquired from sensor 103*b*, and display 101*b* (and/or display system 101*b*) is not level (i.e. the measured angle of tilt is not within a range stored in level data 1203), processor 208*b* does not control the display orientation of display 101*b* as described above.

Figure 13:
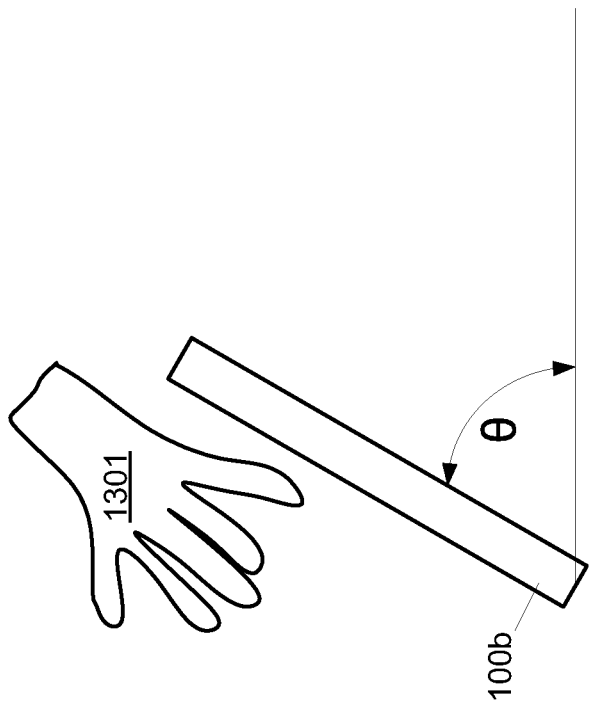
FIG. 13 depicts a side view of the display system of FIG. 11 at a tilt angle, according to non-limiting implementations.

For example, FIG. 13 depicts a side view of display system 100*b* at a tilt angle θ. Presuming the given reference image in these implementations is again a hand, when a hand 1301 is placed in front of display system 100*b*, such that sensor 103*b* can acquire an electronic image of hand 1301, processor 208*b* controls the display orientation of display 101*b* as described above only when tilt angle θ is within a range, or the like, stored at level data 1203.

Figure 14:
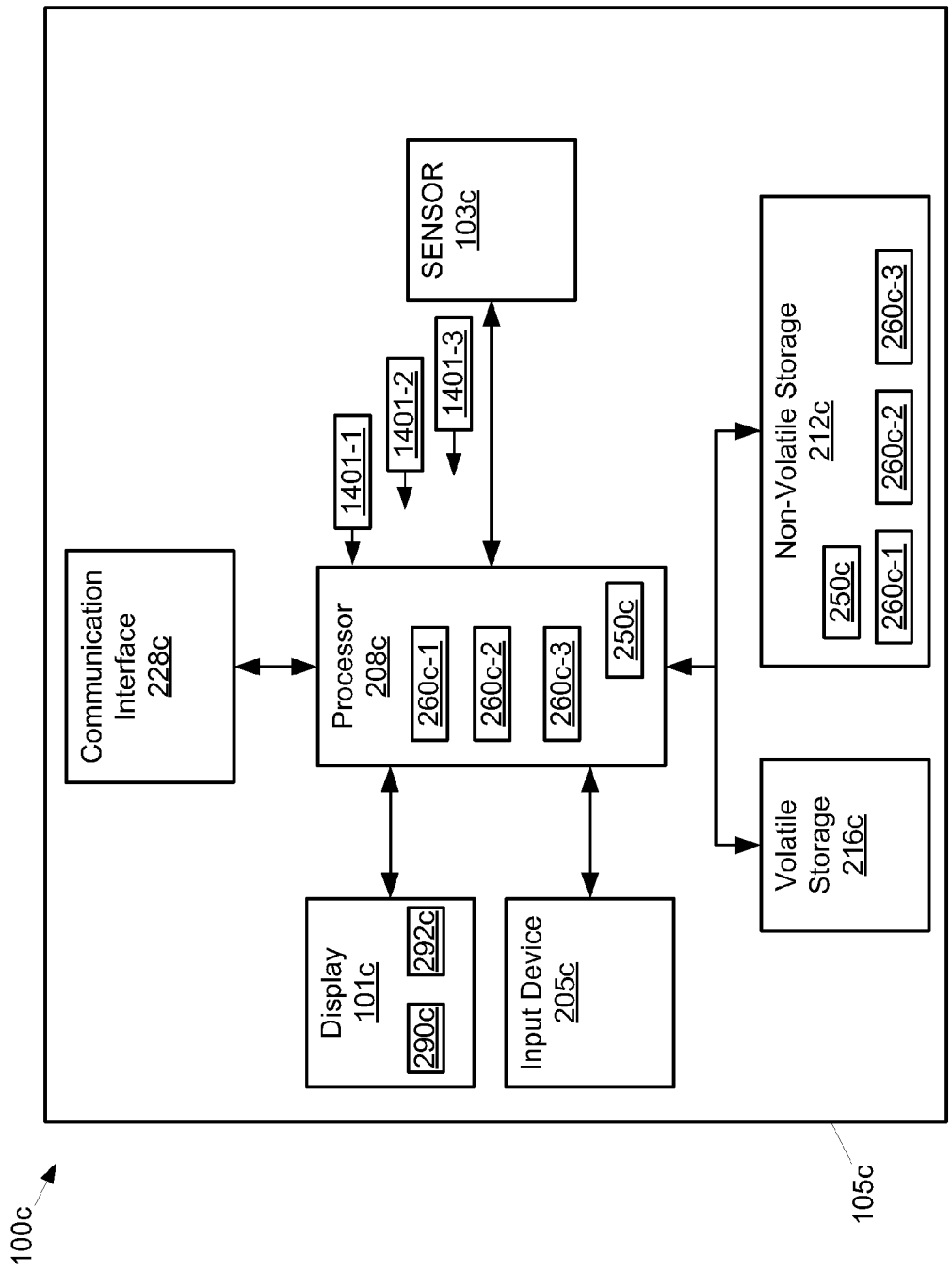
FIG. 14 depicts a schematic diagram of a display system with image sensor based display orientation in a learning mode, according to non-limiting implementations.

Attention is next directed to FIG. 14, which depicts a display system 100*c* similar to display system 100. It is appreciated that FIG. 14 is substantially similar to FIG. 2, with like elements having like numbers, however with a "c" appended thereto. Hence display system 100*c* comprises a display 101*c* (comprising circuitry 290*c* that can be controlled to render an image 292*c* of data at display 101*c*), a sensor 103*c*, a housing 105*c*, an input device 205*c*, a processor 208*c*, non-volatile storage unit 212*c*, volatile storage unit 216*c*, and an optional communication interface 228*c*. Further, non-volatile storage unit 212*c* stores application 250*c*, similar to application 250, however, when processor 208*c* processes application 250*c*, in addition to the functionality described above, processor 208 is further enabled to acquire and store data 260*c* associated with one or more given reference images in a learning mode.

Figure 15:
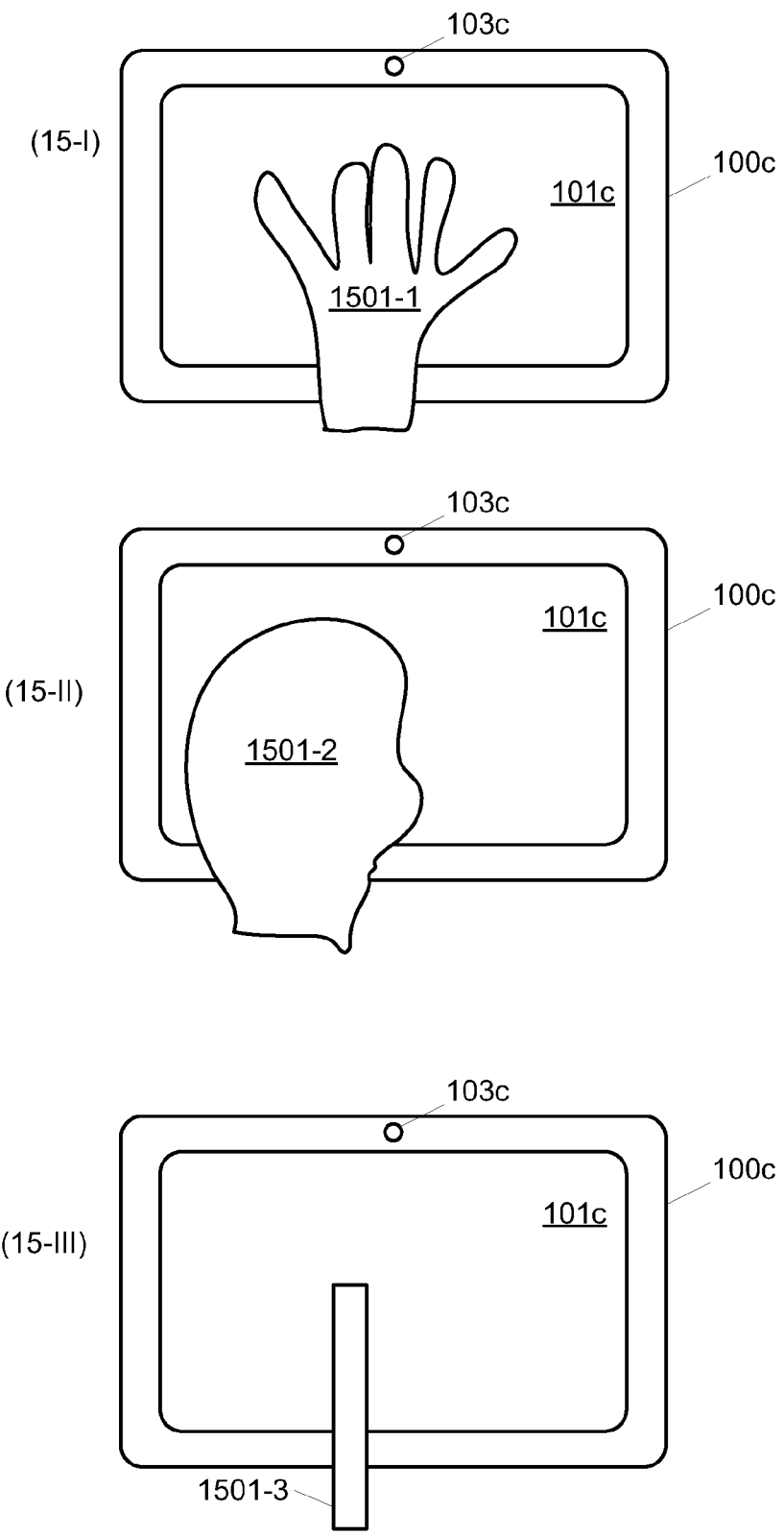
FIG. 15 depicts a front view display system of FIG. 14 acquiring given reference images for changing a display orientation, according to non-limiting implementations.

For example, attention is further directed to FIG. 15, which depicts display system 100*c* in use in the learning mode. At (15-1) a user places a first item 1501-1 for which a first reference image is to be acquired above sensor 103*c*, for example one of his hands. An electronic image 1401-1 of item 1501-1 is acquired at sensor 103*c*, as depicted in FIG. 14, and received at processor 208*c*. Image 1401-1 can be acquired via a user interacting with input device 205*c* and display 101*c* (e.g. by accessing commands, virtual buttons, pulldown menus and the like rendered at display 101*c*). In any event, processor 208*c* produces data 260*c*-1, similar to data 260, associated with item 1501-1 and stores data 260*c*-1 at non-volatile storage unit 212*c*.

Similarly, at (15-II), a user places a second item 1501-2 for which a second reference image is to be acquired above sensor 103*c*, for example his head. An electronic image 1401-2 of item 1501-2 is acquired at sensor 103*c*, as depicted in FIG. 14, and received at processor 208*c*. Processor 208*c* produces data 260*c*-2 associated with item 1501-2 and stores data 260*c*-2 at non-volatile storage unit 212*c*. The process is repeated again at (15-III): a user places a third item 1501-3 for which a third reference image is to be acquired above sensor 103*c*, for example a stylus, a pen, a pencil, and the like. An electronic image 1401-3 of item 1501-3 is acquired at sensor 103*c*, as depicted in FIG. 14, and received at processor 208*c*. Processor 208*c* produces data 260*c*-3 associated with item 1501-3 and stores data 260*c*-3 at non-volatile storage unit 212*c*.

Acquiring data 260*c* can be repeated for as many items as desired, however, in some implementations, the number of items can be capped at maximum number (e.g. in the range of about 1 to about 10 items) to prevent a large amount of data 260*c* indicative of given reference images from being stored at display system 100*c*. Indeed, in some implementations, the maximum number can used to limit the number of items that can be used to change display orientation of display 101*c* to prevent accidental changes in display orientation.

It is further appreciated that data 260*c* is hence associated with a plurality of given reference images, and processor 208*c* can be enabled to control display 101*c* to a display orientation associated with a given edge of display 101*c* when the portion of at least one electronic image associated with the given edge comprises a given one of the plurality of given reference images. Further, a number of the plurality of given reference images can be less than or equal to a given maximum number, as described above.

In implementations described heretofore, when it is determined that a portion of at least one electronic image associated with a given edge of a display device comprises a given reference image, the display orientation of the entire display device is controlled. However, in other implementations, the display orientation of a subset of the display device can be controlled. For example, attention is next directed to FIGS. 16 and 17, which are substantially similar to FIGS. 7 and 8, respectively, with like elements having like numbers, however with a "d" appended thereto. Hence display system 100*d* comprises a display 101*d*, a sensor 103*d*, a housing 105*d*, an input device 205*d*, a processor 208*d*, non-volatile storage unit 212*d* (storing application 250*d* and data 260*d*), volatile storage unit 216*d*, and an optional communication interface 228*d*. However, in these implementations, processor 208*d* is enabled to: control at least a subset of display 101*d* to a display orientation associated with a given edge of display 101d when a portion of the at least one electronic image 600d associated with the given edge comprises a given reference image. In other words, the display orientation of only subset of display 101d can be controlled by transmitting a signal 701d to display 101d causing circuitry 290d to change a display orientation of a subset of rendered image 292d.

For example, FIG. 17 depicts a sequence according to present implementations. It is appreciated that there are three drawings in FIG. 17, labelled (17-I), (17-II), (17-III), respectively similar to (8-I), (8-II), (8-III) of FIG. 8. It is further appreciated that rendered image 292d is depicted in FIG. 17 at display 101d, and that rendered image is generally divided into an upper subset 1700-1 rendered at an upper subset of display 101d, and a lower subset 1700-2 rendered on a lower subset of display 101d.

In any event, (17-I) depicts display system 100d in a first display orientation, with a top of subset 1700-1 along top edge 111d-1 of display 101d, and a bottom of subset 1700-2 along bottom edge 111d-1 of display 101d, with both subsets 1700 extending between edges 111d-3 and 111d-4. However, a person (e.g. Person B) then holds his hand 1701 over display system 100d (17-II), hand 1701 approaching display system 100 along top edge 111-1, such that sensor 103d acquires electronic image 600d of hand 1701, similar to image 600 of FIG. 6. As has already been described, processor 208d determines that a portion of electronic image 600d comprises a given reference image, i.e. a hand. In response (17-III), processor 208d controls a subset of display 101d to a display orientation associated with edge 111d-1, i.e. an upper portion of display 101d that comprises subset 1700-1. In other words, the display orientation of an upper portion of display 101d comprising subset 1700-1 changes to a second display orientation, with a bottom of 1700-1 along top edge 111-1 (i.e. the display orientation of the upper portion changes by 180°). However, lower portion 1700-2 remains unchanged.

While implementations have been described in which an upper portion and lower portion of display 101d are defined by a bisection of display 101d, in other implementations, the subset of display 101d for which the display orientation is controlled when a portion of the at least one electronic image associated with the given edge comprises a given reference image can be any suitable subset of display 101d. Indeed, it is appreciated that the subset of display 101d that is controlled can be any suitable subset of display 101d, and further the subset can be pre-configured and/or defined via input device 205d.

Indeed, in particular non-limiting implementations, it is appreciated that the display orientation of one or more content and controls at display 101d can be controlled. Control of display orientation of content has already been described with regard to rendered image 292d. However, in some implementations, rendered image 292 can comprises rendered controls for controlling content, including, but not limited to, slides in a presentation (e.g. forward, back etc.). In these implementations, the display orientation of the controls rendered at display 101d can be changed.

With regard to defining the subset via input device 105d, input device 205d can be used to define an area of display 101d for which the display orientation is to be controlled via a touchscreen, pointing device and the like. An example sequence could proceed as follows: two users are interacting with a touchscreen tablet device, discussing a presentation. The display orientation can be towards a first user. The second user can indicate via the touchscreen a portion of the display he/she would like to interact with, for example by circling that portion with his finger, a stylus and the like. This interaction can optionally be preceded and/or followed by a touch sequence indicating a selection to be controlled. The second user can then hold his hand over sensor thereby causing the display orientation of the selected area to be controlled as described above. The selection can include, but is not limited to, a bisection of the display (as described), a selection of a given element (such as a graph or picture), circling a given portion with a finger and the like.

Hence, it is appreciated that the subset of a display device for which display orientation can be controlled can comprise one or more of: an entire image rendered at the display device; a given element rendered at the display device; a selected element rendered at the display device; a selected area of the display device; and a predetermined area of the display device.

It is yet further appreciated that the described control of display orientation of a subset of display can be applied to all suitable implementations described herein.

Persons skilled in the art will appreciate that there are yet more alternative implementations and modifications possible, and that the above examples are only illustrations of one or more implementations. For example, while sensor 103 can comprise an infrared sensor such that display system 100 can function in low lighting scenarios. However in implementations where sensor 103 is sensitive to human visible radiation, display 101 can comprise a light emitting display, including, but not limited to, an LCD display; in low lighting scenarios, brightness of display 101 can be controlled such that items placed above sensor 103 can be illuminated by display 101. The ambient brightness can be determined via sensor 103 and/or by an optional light sensor.

Figure 18:
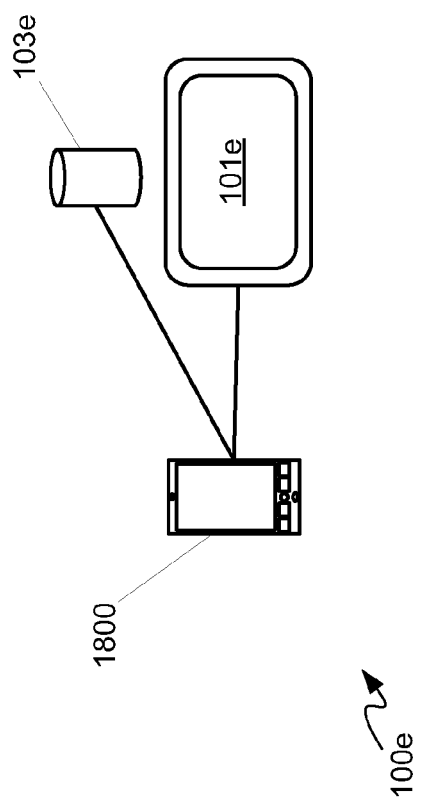
FIG. 18 depicts a perspective view of a multi-component display system with image sensor based display orientation, according to non-limiting implementations.

In other implementations as depicted in FIG. 18, a display system 100e comprises a display 101e, similar to display 101, and a sensor 103e similar to sensor 103c, and a computing device 1800 comprising a processor (not depicted). A display orientation of display 101e can be controlled by computing device 1800, and sensor 103e can be in communication with computing device 1800; otherwise it is appreciated that display 101e, sensor 103e and computing device 1800 are separate, stand-alone devices. Sensor 103e is arranged adjacent display 101e such that at least one electronic image from a field of view proximal display 101e can be acquired. Computing device 1800 can control display 101e to a display orientation associated with a given edge of display 101e when a portion of the at least one electronic image associated with the given edge comprises a given reference image, as described above. In other words, display system 100e is similar to display system 100, however display 101e and sensor 103e are separate components from each other and computing device 1800 (including a processor), with display 101e and sensor 103e in communication with computing device 1800.

It is yet further appreciated that, in yet further implementations, one of display device 101e and computing device 1800 can comprise sensor 103e. In yet further implementations, computing device 1800 can comprise display device 101e.

In any event, by controlling the display orientation of a display based on electronic images acquired by a sensor from field of view proximal the display device, the display orientation can be controlled without physically moving the display device, thereby preventing accidental display orientations that can occur when the display device is physically moved.

Those skilled in the art will appreciate that in some implementations, the functionality of display systems 100, 100a, 100b, 100c, 100d, 100e can be implemented using pre-programmed hardware or firmware elements (e.g., application specific integrated circuits (ASICs), electrically erasable programmable read-only memories (EEPROMs), etc.), or other related components. In other implementations, the functionality of display systems 100, 100a, 100b, 100c, 100d, 100e can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyrights whatsoever.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A display system comprising:
a touchscreen device
a display device;
a housing comprising the display device;
a sensor for acquiring at least one non-touch electronic image from a field of view over the display device the sensor located proximal the display device; and
a processor configured to:
render an image at the display device such that a rendered image is provided at the display device, all of the rendered image initially oriented in a same display orientation at the display device;
after the rendered image is provided at the display device, receive, using the touchscreen device, circling touch input circling a first subset of the rendered image at the display device, the circling touch input identifying the first subset of the rendered image which is initially oriented in the same display orientation as a remaining portion of the rendered image at the display device;
after receiving the circling touch input, acquire at the sensor the at least one non-touch electronic image associated with a given edge of the display device, the given edge adjacent the first subset of the rendered image at the display device; and, after the at least one non-touch electronic image associated with a given edge of the display device is acquired and when a portion of the at least one non-touch electronic image comprises a given reference image,
change the first subset of the rendered image at the display device from the same display orientation to a rotated display orientation oriented with the given edge, the rotated display orientation different from the same display orientation while leaving the second subset of the rendered image at the display device unchanged in the same display orientation.

2. The display system of claim 1, wherein the sensor comprises at least one of: a camera device; a CMOS (Complementary metal-oxide-semiconductor) image sensor; and a CCD (charge-coupled device) image sensor.

3. The display system of claim 1, wherein the display device comprises at least one of a cathode ray tube, a flat panel display, a liquid crystal display (LCD), an organic light emitting diode, a plasma display, and a touchscreen.

4. The display system of claim 1, wherein the housing further comprises the sensor located proximal the display device.

5. The display system of claim 1, wherein the given reference image comprises at least one of: a body part, a hand, a face, a foot, and a stylus.

6. The display system of claim 1, wherein, the same display orientation is oriented with an edge opposite the given edge.

7. The display system of claim 1, wherein the same display orientation is one of a first landscape orientation and a first portrait orientation, and the rotated display orientation is one of a second landscape orientation rotated 180° to the first landscape orientation and second portrait orientation rotated 180° to the first portrait orientation.

8. The display system of claim 1, wherein the display device is a quadrilateral, and the given edge comprises a specific edge of the quadrilateral.

9. The display system of claim 1, wherein the display device comprises a plurality of edges, wherein each respective edge of the display device is associated with respective display orientations of the display device and the processor is further configured to:
change the first subset of the rendered image at the display device to a respective display orientation when the given reference image is determined to be in a respective portion of the at least one non-touch electronic image associated with a respective edge, while leaving the second subset of the rendered image at the display device unchanged in the same display orientation.

10. The display system of claim 1, wherein the processor is further configured to:
change the first subset of the rendered image at the display device to yet a further display orientation associated with two given edges of the display device when a portion of the at least one non-touch electronic image associated with the two given edges comprises the given reference image, while leaving the second subset of the rendered image at the display device unchanged in the same display orientation.

11. The display system of claim 1, wherein the processor is further configured to:
change the first subset of the rendered image at the display device to the rotated display orientation oriented with the given edge when the portion of the non-touch electronic image comprises the given reference image for a given time period.

12. The display system of claim 1, further comprising an apparatus for determining an incline of the display device, the processor further configured to:
  when the portion of the at least one non-touch electronic image comprises the given reference image and the display device is about level: change the first subset of the rendered image at the display device to the rotated display orientation, while leaving the second subset of the rendered image at the display device unchanged in the same display orientation.

13. The display system of claim 1, wherein the processor is further configured to determine that the portion of the at least one non-touch electronic image comprises the given reference image by one or more of:
  processing the at least non-touch one electronic image;
  computer vision;
  comparing at least a subset of the at least one non-touch electronic image to the given reference image stored at a memory; and,
  applying mathematical rules associated with the given reference image to the at least one non-touch electronic image.

14. The display system of claim 1, wherein the processor is further configured to acquire and store data associated with the given reference image in a learning mode.

15. The display system of claim 1, wherein the processor is further configured to:
  change the first subset of the rendered image at the display device to the rotated display orientation when the portion of the at least one non-touch electronic image comprises a given one of a plurality of given reference images, the plurality of given reference images comprising the given reference image.

16. The display system of claim 15, wherein a number of the plurality of given reference images is less than or equal to a given maximum number.

17. The display system of claim 1, further comprising a tablet device, the tablet device comprising the sensor, the display and the processor.

18. The display system of claim 1, wherein the first subset of the rendered image at the display device identified by the circling touch input comprises a selection of a bisection of the display device.

* * * * *